(12) United States Patent
Kruglick

(10) Patent No.: US 8,918,794 B2
(45) Date of Patent: Dec. 23, 2014

(54) QUALITY OF SERVICE AWARE CAPTIVE AGGREGATION WITH TRUE DATACENTER TESTING

(75) Inventor: Ezekiel Kruglick, Poway, CA (US)

(73) Assignee: Empire Technology Development LLC

( * ) Notice: Subject to any disclaimer, the term of this patent is extended or adjusted under 35 U.S.C. 154(b) by 398 days.

(21) Appl. No.: 13/389,796

(22) PCT Filed: Aug. 25, 2011

(86) PCT No.: PCT/US2011/049080
§ 371 (c)(1),
(2), (4) Date: Feb. 9, 2012

(87) PCT Pub. No.: WO2013/028193
PCT Pub. Date: Feb. 28, 2013

(65) Prior Publication Data
US 2013/0055280 A1 Feb. 28, 2013

(51) Int. Cl.
*G06F 9/46* (2006.01)
*G06F 9/50* (2006.01)
(52) U.S. Cl.
CPC ........ *G06F 9/5027* (2013.01); *G06F 2209/509* (2013.01); *G06F 2209/501* (2013.01)
USPC .......................................... 718/104; 705/7.38
(58) Field of Classification Search
None
See application file for complete search history.

(56) References Cited

U.S. PATENT DOCUMENTS

| | | | | |
|---|---|---|---|---|
| 2002/0194251 A1* | 12/2002 | Richter et al. | ................ | 709/105 |
| 2002/0194324 A1* | 12/2002 | Guha | ............................ | 709/223 |
| 2003/0158928 A1* | 8/2003 | Knox et al. | ................... | 709/223 |
| 2003/0191795 A1* | 10/2003 | Bernardin et al. | ............ | 709/105 |
| 2006/0059253 A1* | 3/2006 | Goodman et al. | ............ | 709/223 |
| 2008/0215718 A1* | 9/2008 | Stolorz et al. | ................. | 709/223 |
| 2009/0037162 A1 | 2/2009 | Gaither et al. | | |
| 2009/0037164 A1 | 2/2009 | Gaither et al. | | |
| 2009/0119233 A1* | 5/2009 | Dunagan et al. | ............. | 705/412 |
| 2009/0132699 A1* | 5/2009 | Sharma et al. | ................ | 709/224 |
| 2009/0193146 A1* | 7/2009 | Albert et al. | .................. | 709/241 |
| 2009/0199160 A1* | 8/2009 | Vaitheeswaran et al. | ..... | 717/124 |
| 2009/0300635 A1 | 12/2009 | Ferris | | |
| 2010/0050172 A1 | 2/2010 | Ferris | | |

(Continued)

OTHER PUBLICATIONS

Amazon EC2 Instance Types. Amazon Web Services. Static URL http://aws.amazon.com/ec2/instance-types/ accessed Oct. 26, 2011.

(Continued)

*Primary Examiner* — Emerson Puente
*Assistant Examiner* — Mehran Kamran
(74) *Attorney, Agent, or Firm* — Turk IP Law, LLC

(57) ABSTRACT

Technologies are generally described for efficient datacenter management. In some examples, client jobs on a datacenter are subcontracted out to another datacenter so that the subcontracted jobs can be pulled back to the original datacenter when capacity becomes available again. A captive aggregator module combining network message, command management, data analysis on QoS effects of traffic relay, and strategic management decides whether it makes sense to keep tasks captively aggregated. A middleware system for testing true performance of an application or surrogate and optimizing among multiple datacenters based on true performance evaluates candidate datacenters prior to subcontracting jobs from the original datacenter. The middleware deploys the application to multiple candidate clouds to perform substantially similar tasks on resources that claim to be roughly equivalent in price/performance. The middleware receives data on actual cost and resource consumption, analyzes differences, and redistributes actual work tasks to take advantage of differences.

21 Claims, 8 Drawing Sheets

(56) References Cited

U.S. PATENT DOCUMENTS

| | | | |
|---|---|---|---|
| 2010/0131624 A1 | 5/2010 | Ferris | |
| 2010/0228819 A1* | 9/2010 | Wei | 709/203 |
| 2010/0235431 A1* | 9/2010 | Poluri et al. | 709/203 |
| 2010/0306379 A1 | 12/2010 | Ferris | |
| 2010/0318609 A1* | 12/2010 | Lahiri et al. | 709/205 |
| 2011/0191773 A1* | 8/2011 | Pavel et al. | 718/100 |
| 2011/0320520 A1* | 12/2011 | Jain | 709/203 |
| 2012/0011190 A1* | 1/2012 | Driesen et al. | 709/202 |
| 2012/0136697 A1* | 5/2012 | Peles et al. | 705/7.38 |
| 2012/0174111 A1* | 7/2012 | Pala et al. | 718/102 |
| 2012/0191774 A1* | 7/2012 | Bhaskaran et al. | 709/203 |
| 2012/0260255 A1* | 10/2012 | Arnold et al. | 718/102 |
| 2012/0297016 A1* | 11/2012 | Iyer et al. | 709/217 |
| 2012/0297238 A1* | 11/2012 | Watson et al. | 714/4.11 |
| 2012/0303818 A1* | 11/2012 | Thibeault et al. | 709/226 |
| 2012/0324259 A1* | 12/2012 | Aasheim et al. | 713/320 |
| 2013/0031559 A1* | 1/2013 | Alicherry | 718/104 |
| 2013/0047161 A1* | 2/2013 | Simitsis et al. | 718/100 |

OTHER PUBLICATIONS

Chris Meller, Rackspace Cloud Servers vs. Amazon EC2: Performance, CPU, http://chrismeller.com/2011/03/rackspace-cloud-servers-vs-amazon-ec2-performance-cpu, Mar. 1, 2011.

J. Pruyne and V. Machriraju, "Quartermaster: Grid Services for Data Center Resource Reservation," in Global Grid Forum Workshop on Designing and Building Grid Services, 2003.

Online-Only Currency Bitcoin Reaches Dollar Parity. Slashdot.org. URL accessed Oct. 26, 2011 http://news.slashdot.org/story/11/02/10/189246/Online-Only-Currency-BitCoin-Reaches-Dollar-Parity.

Matthew Sacks, Rackspace Cloud Servers Versus Amazon EC2 Performance Analysis, http://www.thebitsource.com/featured-posts/rackspace-cloud-servers-versus-amazon-ec2-performance-analysis.

D.Bernstein et al., "Blueprint for the intercloud-Protocols and formats for cloud computing interoperability," in 2009 Fourth International Conference on Internet and Web Applications and Services (IEEE, 2009), 328-336.

L. Badger and T. Grance, "Standards Acceleration to Jumpstart Adoption of Cloud Computing" (SAJACC) (2010).

Jacob Aron. "Internet Probe Can Track You Down to Within 690 Meters". Tech. New Scientist. Apr. 5, 2011. http://www.newscientist.com/article/dn20336-internet-probe-can-track-you-down-to-within-690-metres.html.

K. Kant, "Data center evolution:: A tutorial on state of the art, issues, and challenges," Computer Networks 53, No. 17 (2009): 2939-2965. in online advertising.

CloudLink™ Product Brief, Afore Solutions Inc., Ottawa, Ontario Canada, rev 1.0 Aug. 2010.

International Search Report and Written Opinion PCT/US11/49080 mailed Jan. 1, 2012.

International Preliminary Report on Patentability for PCT/US2011/049080 filed Aug. 25, 2011, mailed Mar. 6, 2014, issued Feb. 25, 2014.

* cited by examiner

QUALITY OF SERVICE AWARE CAPTIVE AGGREGATION WITH TRUE DATACENTER TESTING

CROSS REFERENCE TO RELATED APPLICATIONS

This Application is the National Stage filing under 35 of US.C. §371 of PCT Application Ser. No. PCT/US11/49080 filed on Aug. 25, 2011. The disclosure of the PCT Application is hereby incorporated by reference in its entirety.

BACKGROUND

Unless otherwise indicated herein, the materials described in this section are not prior art to the claims in this application and are not admitted to be prior art by inclusion in this section.

Trends toward unification of cloud based services include coding and standards frameworks that allow customers to move from one datacenter provider to another. Datacenter brokers are increasingly common entities who work to capture better deals for clients and thus are making the tasks more mobile. At the same time, a cloud vendor may wish to sell the highest Quality of Service (QoS) it can perform in order to raise pricing, but when new work arrives with a higher requested QoS, the new work may mean rejecting ongoing lower QoS work to clear resources and thus being left with empty processors once the high QoS work is completed.

Cloud computing resources are provided in imprecise unit measures. Examples include memory, bit width, and rough I/O performance, but do not usually specify processor types, for example. "Equivalent processing power" and I/O performance are measured in granularity as rough as Low/Medium/High, which means that complex distributed applications may perform differently on different clouds, even on identically specified and priced computing units. One service provider's equivalent instances may be faster at CPU than another provider's, but slower in storage 110. The relative performance difference between identically specified clouds may change over time due to internal network congestion, equipment replacement, and even usage level.

There presently are shortcomings in conventional datacenter management methods. For example, the difference in performance raises the possibility of arbitrage—taking advantage of a value difference between markets using better information. If a user has a true measure of how much work their application can perform for a given price on different clouds, they may choose the cheapest and thereby save money purely by informational advantage.

SUMMARY

According to some examples, a method for managing Quality of Service (QoS) aware captive aggregation with datacenter testing through middleware is provided. The method may include receiving a job at a datacenter, determining a suitable subcontract datacenter for at least one of a plurality of existing jobs at the datacenter, forwarding the at least one existing job to the suitable subcontract datacenter, and upon receiving results of the forwarded job, providing the results to an originating client. The received job may exceed a capacity of the datacenter and a QoS for the forwarded job may be maintained at a substantially same level as if the job was performed at the datacenter.

According to other examples, an apparatus for managing Quality of Service (QoS) aware captive aggregation with datacenter testing through middleware may include a memory and a processor coupled to the memory. The processor may be configured to execute a captive aggregation module in conjunction with a datacenter management application. The captive aggregation module may be configured to receive a job at a datacenter, where the received job exceeds a capacity of the datacenter; determine a suitable subcontract datacenter for at least one of a plurality of existing jobs at the datacenter; forward the at least one existing job to the suitable subcontract datacenter; and upon receiving results of the forwarded job, provide the results to an originating client, where a QoS for the forwarded job is maintained at a substantially same level as if the job was performed at the datacenter.

According to further examples, a captive aggregation module for managing Quality of Service (QoS) aware job distribution in conjunction with datacenter management may be provided. The captive aggregation module may be configured to receive a job at a datacenter, where the received job exceeds a capacity of the datacenter; determine a suitable subcontract datacenter for at least one of a plurality of existing jobs at the datacenter; forward the at least one existing job to the suitable subcontract datacenter; and upon receiving results of the forwarded job, provide the results to an originating client, where a QoS for the forwarded job is maintained at a substantially same level as if the job was performed at the datacenter.

According to yet other examples, a middleware module may be provided for determining suitability of a subcontract datacenter in Quality of Service (QoS) aware job distribution in conjunction with datacenter management. The middleware module may be configured to deploy a reference task to a plurality of candidate datacenters to perform identical tasks on resources, receive data on an actual cost and resource consumption for performing the reference task, analyze differences between the actual cost and resource consumption for performing the reference task at a datacenter with excess jobs and at a candidate datacenter, and enable a captive aggregation module of the datacenter to forward the job based on analysis results.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
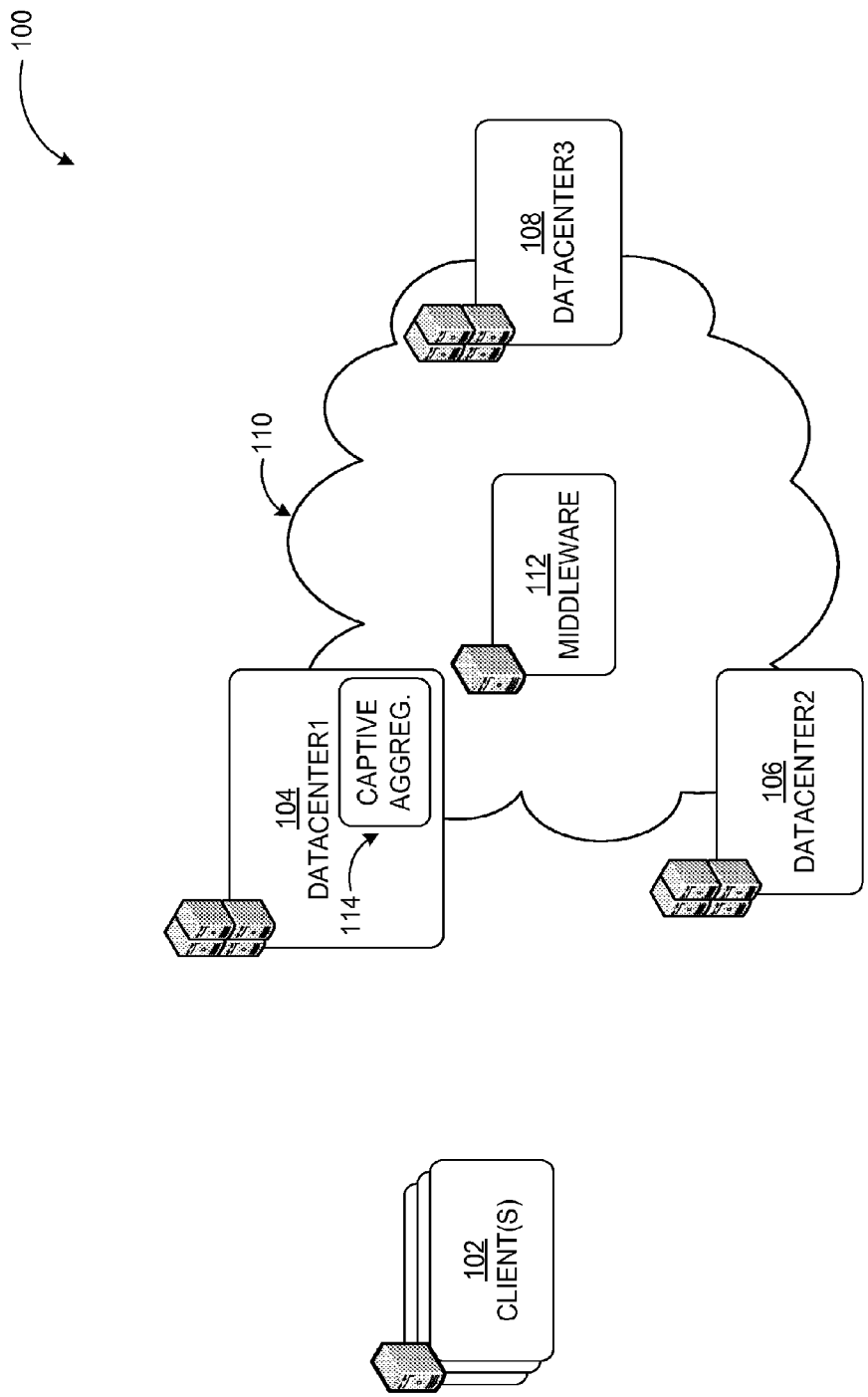
FIG. 1 illustrates an example system, where jobs may be subcontracted between datacenters based on available capacity through a quality of service aware captive aggregator and suitability determination through true datacenter testing.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

Briefly stated, less profitable, but less demanding, client jobs on a datacenter may be subcontracted out to another datacenter so that the subcontracted jobs can be pulled back to the original datacenter when capacity becomes available again. A captive aggregator module combining network message and command management, data analysis on the QoS effects of traffic relay, and strategic management may decide on-demand or continuously whether it makes sense to keep each task captively aggregated. A middleware system for testing the true performance of an application or application surrogate and optimizing among multiple datacenters based on true performance may evaluate candidate datacenters prior to subcontracting of jobs from the original datacenter. The middleware may deploy the application or surrogate to multiple candidate clouds to perform substantially similar tasks on resources that claim to be roughly equivalent in price and/or performance. The middleware may receive data on actual cost and resource consumption, analyze differences, and redistribute actual work tasks to take advantage of differences.

FIG. 1 illustrates an example system, where jobs may be subcontracted between datacenters based on available capacity through a quality of service aware captive aggregator and suitability determination through true datacenter testing, arranged in accordance with at least some embodiments described herein.

A datacenter is a centralized repository for the storage, management, and dissemination of data and information organized around particular bodies of knowledge or pertaining to one or more particular organizations. A private datacenter may exist within an organization's facilities or may be maintained as a specialized facility. Some datacenters may be synonymous with network operations centers (NOCs) containing automated systems that monitor server activity, web traffic, manage data, and network performance. Other datacenters may be specialized on managing tasks for clients such as collection, processing, and/or analysis of data. While datacenters are typically associated with a physical entity (e.g. a server room, a server farm, etc.), datacenters may be configured as Virtual Datacenters (VDCs) as well, where the data is compartmentalized based on size, owner, or other aspects through virtual servers and data stores.

Referring to FIG. 1, as shown in a diagram 100, a multiple number of datacenters 104, 106, and 108 may perform tasks and store data for clients 102. In an example scenario, the datacenter 104 may receive jobs from the clients 102 and schedule the jobs according to its capacity. If the datacenter 104 has reached its capacity when a new job arrives, the datacenter 104 may aggregate-out or transfer the new job or one of the existing jobs to be temporarily performed at a second datacenter 106 and/or a third datacenter 108, managing the process with a captive aggregator module 114. The datacenters may communicate over one or more networks 110. In determining which job(s) to transfer to the datacenters 106 and 108, the captive aggregator module 114 may consider various aspects of the jobs such as their QoS demand, price, etc. For example, the captive aggregator module 114 may transfer out jobs that pay less compared to others maximizing a profitability of the datacenter 104.

In determining which datacenters are suitable to receive subcontract jobs from the datacenter 104, a middleware 112 may be employed to test the true performance of an application or application surrogate among the datacenters 106 and 108. The middleware 112 may deploy the application or surrogate to the datacenters 106 and 108 in order to perform substantially similar tasks on resources that claim to be roughly equivalent in price and/or performance. The middleware 112 may then receive data on actual cost and resource consumption, analyze differences, and redistribute the excess jobs at the datacenter 104 to take advantage of differences.

Figure 2:
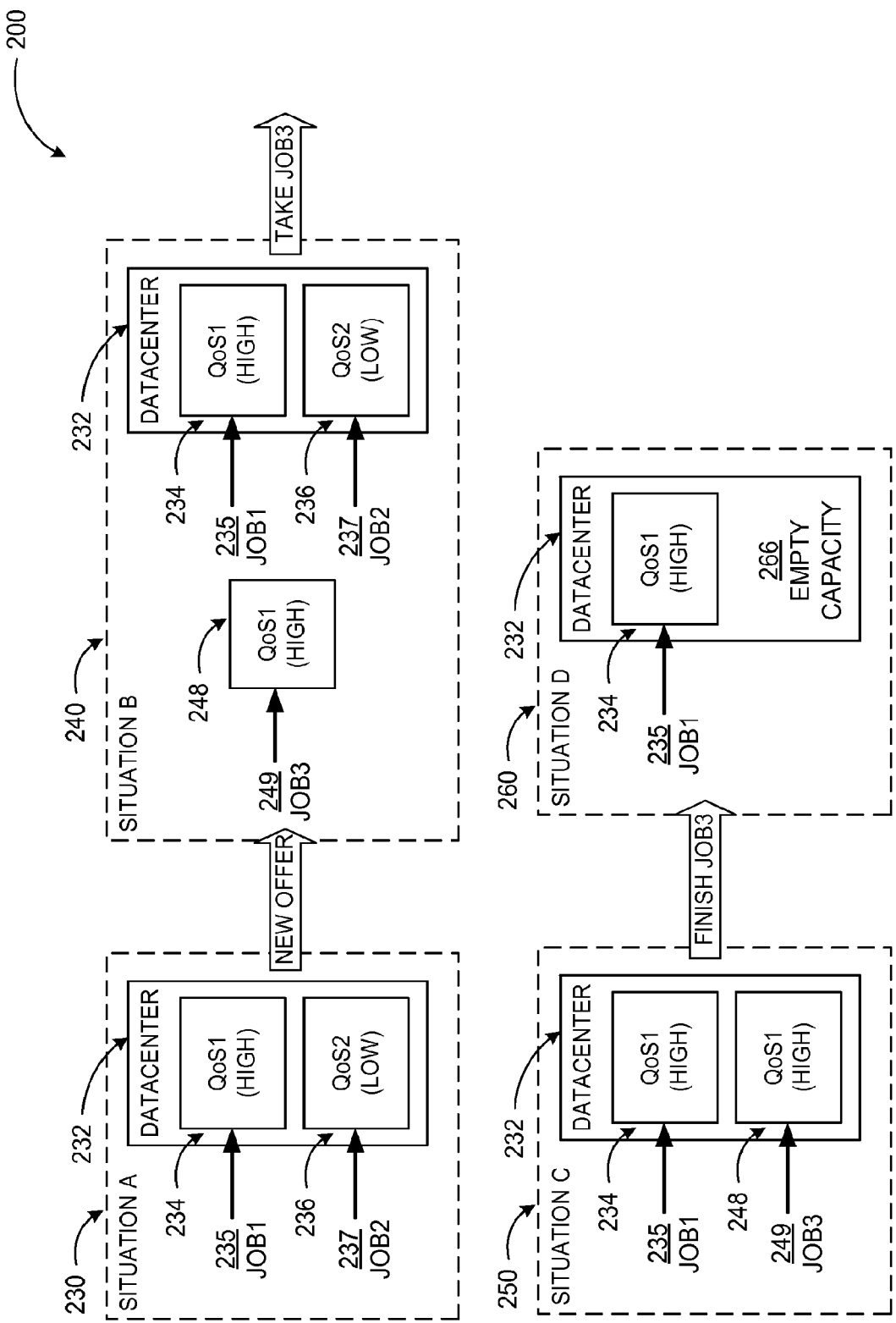
FIG. 2 illustrates example scenarios of receiving jobs with different pricing and QoS in an environment of mobile clients and competition.

FIG. 2 illustrates example scenarios of receiving jobs with different pricing and QoS in an environment of mobile clients and competition, arranged in accordance with at least some embodiments described herein.

A diagram 200 in FIG. 2 displays a situation A 230, where a datacenter 232 with a mix of a well-paid high QoS work (QoS1) 234 and a not-so-well paid low QoS work (QoS2) 236. The QoS1 234 may result from a first job 235, and the QoS2 236 may result from a second job 237. While the QoS1 234 and the QoS2 236 are being performed, a new offer may be received leading to a situation B 240, where a third job 249 resulting in a well-paid high QoS work (QoS1) 248 arrives from a client. The third job 249 may exceed a capacity of the datacenter 232. Thus, the datacenter 232 may turn down the third job 249 and continue performing the first and second jobs 235, 237 and earn less money.

Alternatively, the datacenter 232 may accept the third job 249 allowing the second job 237 (and QoS2 236) to migrate to another provider as shown in a situation C 250. In the situation C 250, the datacenter 232 may perform QoS1 234 and 248 resulting from the first job 235 and the third job 249. Situation C 250 may lead to a situation D 260, where the datacenter 232 may face empty capacity 266 when the QoS1 248 resulting from the third job 249 is completed. If the third job 249 turns out to be fairly short lived, the third job 249 may thus be a short term gain for an overall loss.

Figure 3:
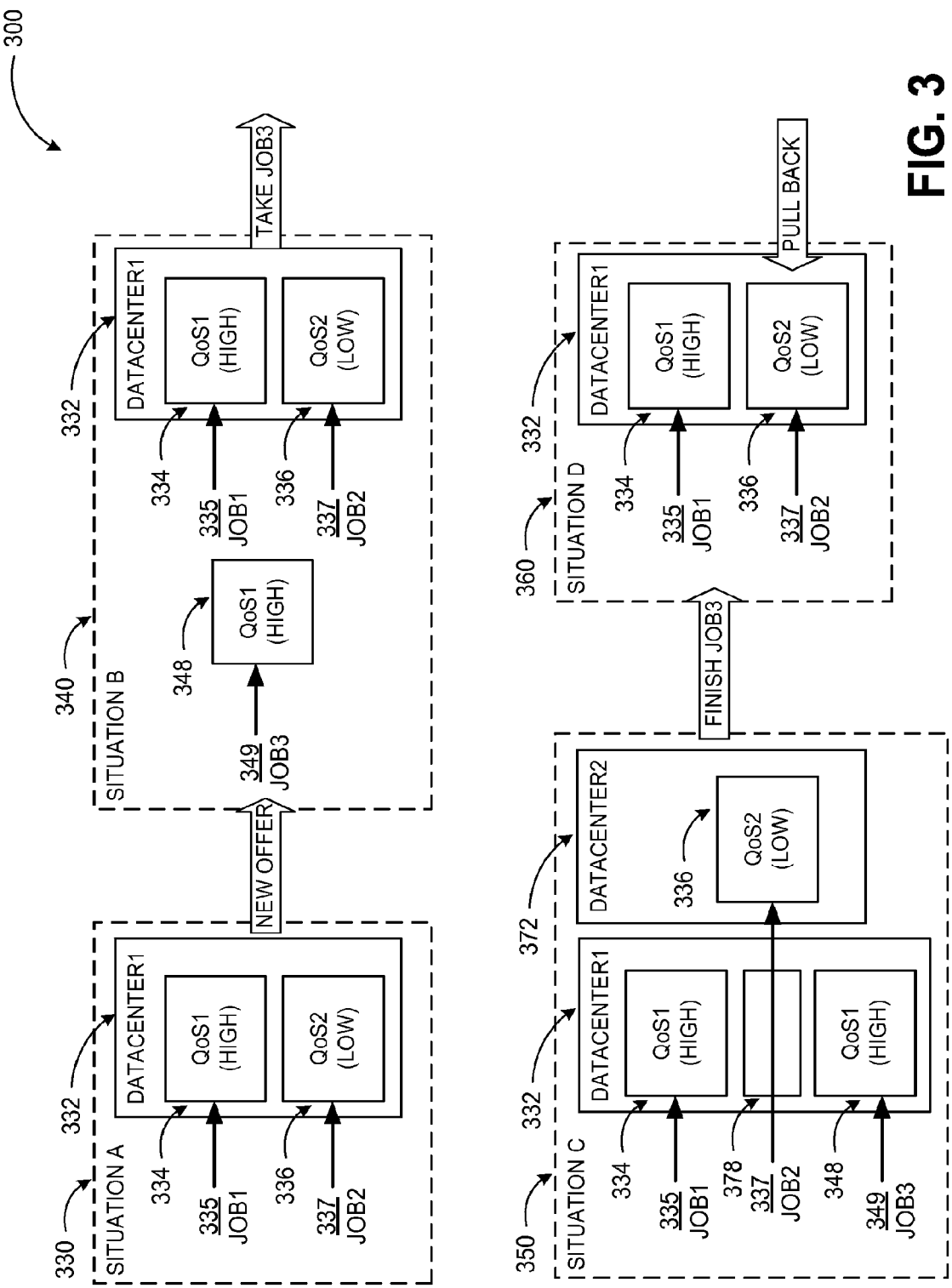
FIG. 3 illustrates a captive aggregator enabling external management of subcontracted tasks in example scenarios.

FIG. 3 illustrates a captive aggregator enabling external management of subcontracted tasks in example scenarios, arranged in accordance with at least some embodiments described herein.

A diagram 300 in FIG. 3 illustrates a strategic advantage of a captive aggregator module 378 to allow external management of subcontracted tasks. Similar to the example scenario in FIG. 2, a datacenter 332 may be performing a mix of a well-paid high QoS work (QoS1) 334 and a not-so-well paid low QoS work (QoS2) 336 in a situation A 330. The QoS1 334 may result from a first job 335, and the QoS2 336 may result from a second job 337. While the QoS1 334 and the QoS2 336 are being performed, a new offer may be received leading to a situation B 340, where a third job 349 resulting in a well-paid high QoS work (QoS1) 348 arrives from a client. The third job 349 may exceed a capacity of the datacenter 332.

Differently from the scenario illustrated in FIG. 2, the datacenter 332 may accept the third job 349. In a situation C 350, the captive aggregator module 378 may evaluate the jobs on-hand and subcontract the low profit QoS2 336 to a second datacenter 372 while transparently maintaining client-facing control of the job. When the third job 349 is completed, a remaining portion of the low profit QoS2 336 may be pulled back from the second datacenter 372 to the datacenter 332 as shown in a situation D 360 allowing the datacenter 332 to operate at substantially full capacity without losing new job offers. The captive aggregator module 378 may handle issues like additional latency and choosing an appropriate datacenter, as well as strategic decisions as to when it is advantageous to release a captive job.

In subcontracting lower QoS jobs by relaying management and instructional commands, the captive aggregator module 378 may perform tasks to minimize and/or make additional latency for the management and instructions transparent to a client. Topological distances between datacenters may be taken into consideration to minimize delays in delivering packets. Furthermore, a QoS agreed for delivery may be compared to the QoS of the subcontracting datacenter with the addition of distance and latency effects. For example, if a performance level has been guaranteed to a client, a higher QoS may need to be purchased from the subcontract datacenter in order to deliver acceptable overall QoS from the aggregation.

Figure 4:
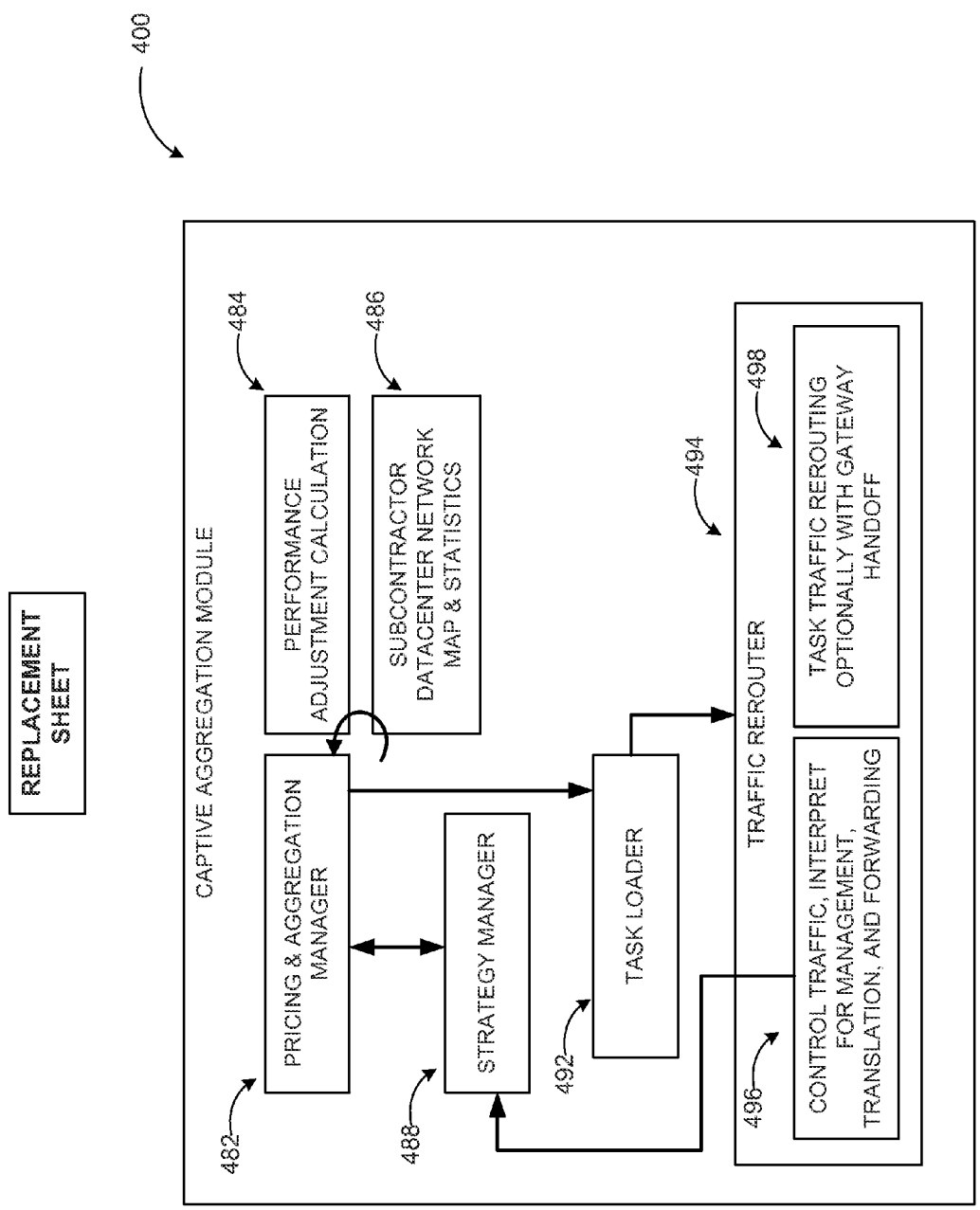
FIG. 4 illustrates major functional components of a captive aggregation module.

FIG. 4 illustrates major functional components of a captive aggregation module 400, arranged in accordance with at least some embodiments described herein.

The captive aggregation module 400 may include a pricing and aggregation manager 482, which may employ a subcontractor datacenter network map and statistics records 486 to perform adjustment calculations 484 in order to provide estimates of a final QoS that may be experienced by an outside client if work currently being held at a datacenter is subcontracted to each available subcontract datacenter via captive aggregation. Once the pricing and aggregation manager 482 selects a subcontract datacenter, a task loader 492 may migrate the work to a destination datacenter and control may be handed off to a traffic rerouter 494.

The traffic rerouter 494 may handle two different streams of traffic. A control traffic 496 may be interpreted so that it can be forwarded if appropriate to controlling the task (such as operation commands) while administrative tasks may not be forwarded if they should be handled locally. A task traffic 498 may be routed through the datacenter and forwarded, or a gateway may be updated so that client users can exchange application data directly with a subcontract datacenter. A strategy manager 488 may decide the benefit and weigh the cost of captive aggregation and include demand and pricing models based on the subcontract datacenter information and the updated control traffic from the traffic rerouter 494 or estimates of task durations, or other strategic information.

The subcontractor datacenter network map and statistics 486 may be built employing localization techniques to physically find a datacenter in order to compute travel times. Alternatively, pings may be used to estimate delays. For datacenters on trunk lines the statistics may be stable, although the information may be updated at regular intervals.

The control traffic 496 may be processed through the captive aggregation module 400 so that the instructions can be parsed and managed at the datacenter. Some messages may be about resource reservations or needs, for example. The datacenter may use the information when considering whether to continue holding the task in captive aggregation. For example, a low profit job may be escalated to a higher QoS level, which may justify the job's immediate return to the original datacenter. Alternately, a size of the work may change such that the work may now fit into empty capacity at the original datacenter, in which case the work may be brought back from the subcontract datacenter; or the size may change such that the strategy manager 488 no longer projects the work can be brought back to the original datacenter even when an existing job is completed, in which case the strategy manager 488 may de-admit the subcontracted job, either by officially handing it off to the subcontract datacenter or by simply informing the client that resources are no longer available.

Some, but not all of these messages may be passed on to the subcontract datacenter for task management. In some cases, the control traffic handling may need to include translation if the original datacenter has different command structures than the subcontract datacenter.

In some cases datacenters may receive an IP range from a client and update gateways so that the datacenter machines directly receive and handle traffic to those IP addresses. In this way, a user may experience delays for an application on the datacenter machines when the user goes to an IP address associated with the client. The task traffic rerouting may eliminate some of the service delays and traffic through the datacenter by updating gateways such that application traffic may go directly to the captive aggregation site, the subcontract datacenter. In a scenario, where user traffic full redirection combined with command and administration traffic is separately parsed and filtered as discussed above, the QoS impact may be on the administrative commands, not the user experience. The performance adjustment calculation 484 may include consideration of whether the application IP addresses can be remapped to eliminate forwarding lags.

In some cases, a combination of pricing & aggregation manager 482 and subcontractor datacenter network map and statistics 486 may be able to find a sublet option closer to the users such that application of traffic rerouting may result in no notable QoS penalty to the captive aggregation. In such cases, the datacenter may be able to maintain a larger number of "reserve tasks" in captive aggregation state, which may be pulled back in on demand to fill empty space.

Figure 5:
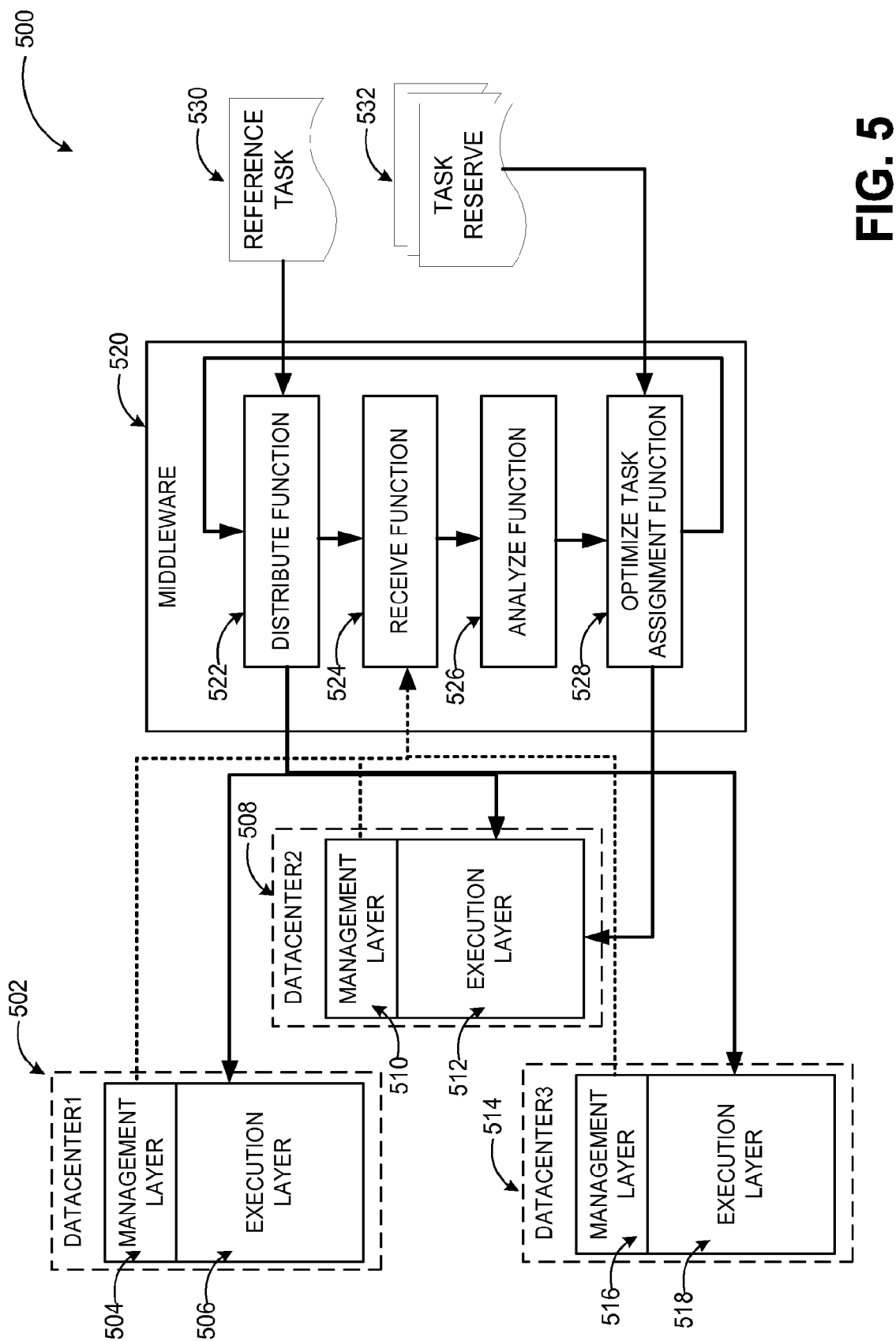
FIG. 5 illustrates major functional components in a true datacenter testing system employing middleware.

FIG. 5 illustrates major functional components in a true datacenter testing system employing middleware, arranged in accordance with at least some embodiments described herein. FIG. 2 through FIG. 4 include a discussion of how excess jobs can be subcontracted to other datacenters from an original datacenter. The suitability of the other datacenters may be determined by testing their cost, performance, or similar attributes through true testing according to some embodiments. A diagram 500 in FIG. 5 displays the use of middleware for performing the true testing in datacenter captive aggregation. According to some embodiments, testing of candidate datacenters employing an actual application or a surrogate application may be performed independently from QoS aware captive aggregation.

In the diagram 500, three example datacenters are shown: a datacenter1 502 with a management layer 504 and an execution layer 506, a datacenter2 508 with a management layer 510 and an execution layer 512, and a datacenter3 514 with a management layer 516 and an execution layer 518. A middleware 520 may include several functions presented in rough flow-chart form. A distribution function 522 may take a reference task 530, which may be an application task or a reference surrogate, and distribute the reference task 530 to multiple datacenter execution layers 506, 512, and 518. Then, a receive function 524 may query and receive from the management layers 504, 510, and 516 information regarding the performance of the reference task 530 such as execution time. Next, an analyze function 526 may analyze the information received and generate comparison metrics differentiating the datacenters 502, 508, and 514 such as effective true cost per unit of useful work in a specific application. An optimize task assignment function 528 may take tasks from a task reserve 532 and assign them based on desired optimization. From this point, the process may repeat on a desired interval and may repeat without interrupting the ongoing real tasks so as to generate information regarding whether or not the tasks need to be redistributed.

According to some embodiments, the reference task 530 may be the desired user application itself. In order to have a steady reference for analyzing the different datacenter performances it may be desirable to run the same inputs through the application on the datacenters being tested. This may add to the cost of the process, however, because there may be no added utility in having the same results multiple times. Another approach may include instrumenting the application code by, for example, taking timestamps at numerous calibrated points in the code around known and repeatable procedure blocks. Instrumentation may go a step further by calibrating relative demand and performance in known conditions of various inputs and recording input types as well as timestamps. The received instrumentation data may be returned to the middleware 520 during the receive step in place of, or in addition to, the management layer data.

A next level of abstraction beyond using the application itself for testing may be construction of a surrogate task. The surrogate may be designed to deploy in a model of the actual application and have similar levels of communications between blocks and computation between actions, but the communications may include test messages and the computation may be repeated simple steps designed to mimic the computation, memory and storage media access, and resource locking of the actual application. Benefits of such a surrogate may include smaller packages to distribute, faster completion of the tests, and more control and opportunities to record data.

The reference task 530 may also be composed of "stress test" elements with known demand. One example may include completing a fixed set of repeated message exchanges. Another example may include a processor test with a known amount of computation. For example, a Bitcoin algorithm may be implemented, which has a known average completion time per block and the cryptographically verifiable output blocks are accepted as a form of digital currency that is currently roughly as valuable as the computational power used to create currency.

In some embodiments, the middleware 520 may be provided by an entity separate from the datacenter subcontracting to other datacenters. In other embodiments, the middleware 520 may be integrated into the datacenter. For example, the middleware 520 may be part of the captive aggregator module and also perform distribution tasks optimizing the distribution based on the analysis results of candidate subcontract datacenters' performance. Continued data collection and arbitrage may be efficiently accomplished by spreading a portion of the work across multiple datacenters if the tasks can be meaningfully compared. In such a case the optimize tasks function 528 may be modified to withhold a fraction of the application and distribute the application (via distribute function 522) to secondary and tertiary datacenters to continuously monitor performance.

If the reference task 530 does not generate significant value and is to be distributed for repeated monitoring, the interval of monitoring may be selected with an eye toward minimizing monitoring cost and maximizing arbitrage opportunity. To address such tasks, data may be gathered on how often the performance changes (e.g., network properties likely change hourly, whereas equipment is perhaps monthly at most) and a minimum testing and measurement may be executed approximately that often. The amount of resources being assigned may also affect the tradeoff.

While embodiments have been discussed above using specific examples, components, and configurations in FIG. 2 through FIG. 5, they are intended to provide a general guideline to be used for implementing QoS aware captive aggregation and true testing based datacenter evaluation. These examples do not constitute a limitation on the embodiments, which may be implemented using other components, modules, and configurations using the principles described herein. For example, any suitable reference task may be used in evaluating candidate datacenters and the tasks associated with evaluating datacenters and captively aggregating jobs may be performed separately or in an integrated manner. Furthermore, actions discussed above may be performed in various orders, especially in an interlaced fashion.

Figure 6:
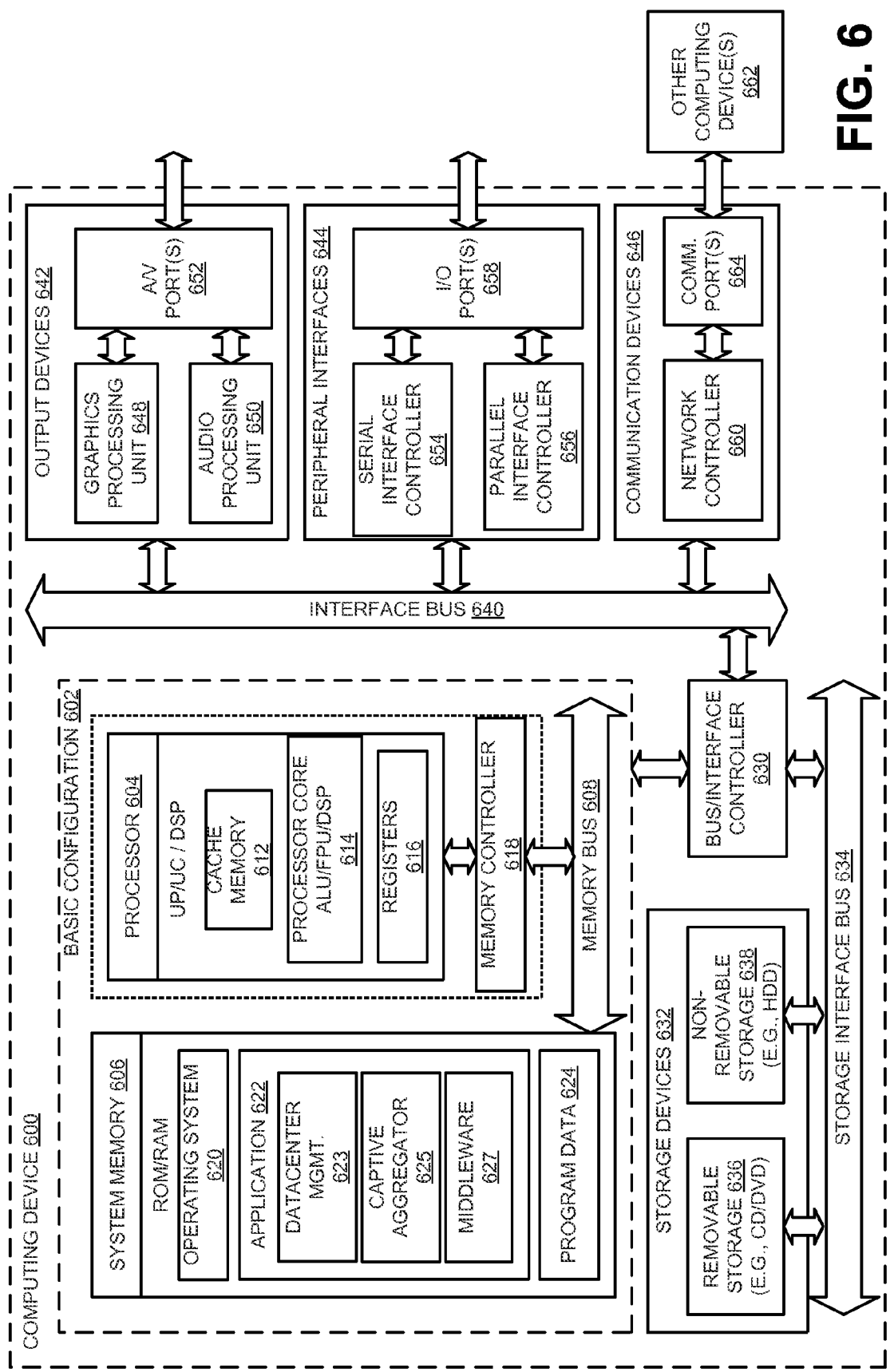
FIG. 6 illustrates a general purpose computing device, which may be used to implement QoS aware captive aggregation with true data center testing.

FIG. 6 illustrates a general purpose computing device, which may be used to implement QoS aware captive aggregation with true data center testing, arranged in accordance with at least some embodiments described herein. In a very basic configuration 602, a computing device 600 typically includes one or more processors 604 and a system memory 606. A memory bus 608 may be used for communicating between the processor 604 and the system memory 606.

Depending on the desired configuration, the processor 604 may be of any type including but not limited to a microprocessor (μP), a microcontroller (μC), a digital signal processor (DSP), or any combination thereof. The processor 604 may include one more levels of caching, such as a level cache memory 612, a processor core 614, and registers 616. The example processor core 614 may include an arithmetic logic unit (ALU), a floating point unit (FPU), a digital signal processing core (DSP Core), or any combination thereof. An example memory controller 618 may also be used with the processor 604, or in some implementations the memory controller 618 may be an internal part of the processor 604.

Depending on the desired configuration, the system memory 606 may be of any type including but not limited to volatile memory (such as RAM), non-volatile memory (such as ROM, flash memory, etc.) or any combination thereof. The system memory 606 may include an operating system 620, one or more applications 622, and program data 624. The applications 622 may include datacenter management application 623 managing various aspects of datacenter operations. Captive aggregator 625, in conjunction with datacenter management application 623, may enable quality of service aware aggregation of jobs among subcontract datacenters. Middleware 627 may test true performance of candidate subcontract datacenters, which may receive excess jobs from the main datacenter as described herein. This described the basic configuration 602 is illustrated in FIG. 6 by those components within the inner dashed line.

The computing device 600 may have additional features or functionality, and additional interfaces to facilitate communications between the basic configuration 602 and any required devices and interfaces. For example, a bus/interface controller 630 may be used to facilitate communications between the basic configuration 602 and one or more data storage devices 632 via a storage interface bus 634. The data storage devices 632 may be removable storage devices 636, non-removable storage devices 638, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

The system memory 606, the removable storage devices 636 and the non-removable storage devices 638 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by the computing device 600. Any such computer storage media may be part of the computing device 600.

The computing device 600 may also include an interface bus 640 for facilitating communication from various interface devices (e.g., output devices 642, peripheral interfaces 644, and communication devices 646) to the basic configuration 602 via bus/interface controller 630. Some example output devices 642 include a graphics processing unit 648 and an audio processing unit 650, which may be configured to communicate to various external devices such as a display or speakers via one or more A/V ports 652. Example peripheral interfaces 644 include a serial interface controller 654 or a parallel interface controller 656, which may be configured to communicate with external devices such as input devices (e.g., keyboard, mouse, pen, voice input device, touch input device, etc.) or other peripheral devices (e.g., printer, scanner, etc.) via one or more I/O ports 658. An example communication device 646 includes a network controller 660, which may be arranged to facilitate communications with one or more other computing devices 662 over a network communication link via one or more communication ports 664.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 600 may be implemented as a part of a general purpose or specialized server, mainframe, or similar computer that includes any of the above functions. The computing device 600 may also be implemented as a personal computer including both laptop computer and non-laptop computer configurations.

Example embodiments may also include methods. These methods can be implemented in any number of ways, including the structures described herein. One such way is by machine operations, of devices of the type described in the present disclosure. Another optional way is for one or more of the individual operations of the methods to be performed in conjunction with one or more human operators performing some of the operations while other operations are performed by machines. These human operators need not be collocated with each other, but each can be only with a machine that performs a portion of the program. In other examples, the human interaction can be automated such as by pre-selected criteria that are machine automated.

Figure 7:
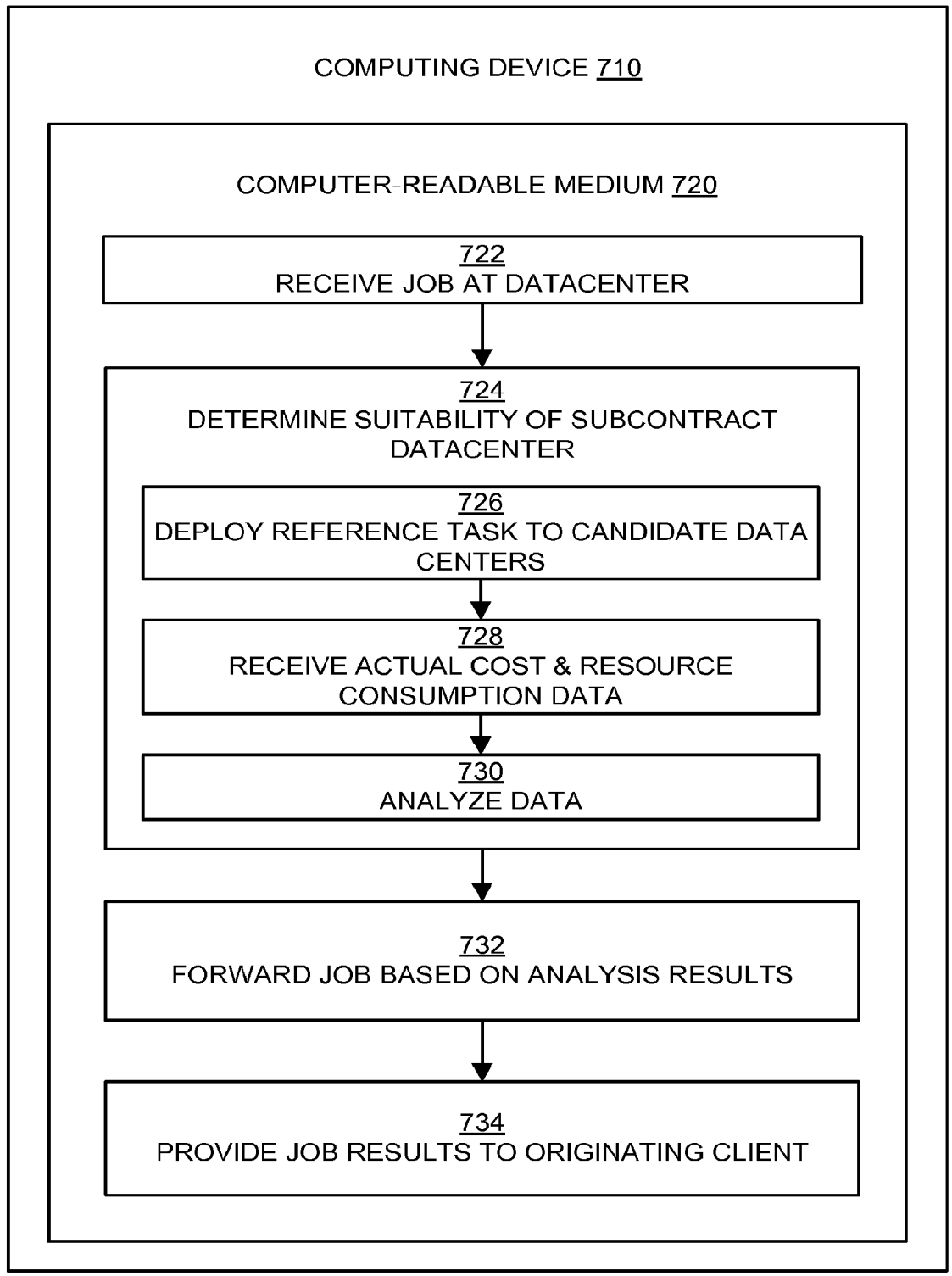
FIG. 7 is a flow diagram illustrating an example method for QoS aware captive aggregation and true testing based datacenter evaluation that may be performed by a computing device such as the device in FIG. 6.

FIG. 7 is a flow diagram illustrating an example method for QoS aware captive aggregation and true testing based datacenter evaluation that may be performed by a computing device such as the device in FIG. 6, arranged in accordance with at least some embodiments described herein. Example methods may include one or more operations, functions or actions as illustrated by one or more of blocks 722, 724, 726, 728, 730, 732, and/or 734. The operations described in blocks 722 through 734 may also be stored as computer-executable instructions in a computer-readable medium such as computer-readable medium 720 of computing device 710.

The process of QoS aware captive aggregation and true testing based datacenter evaluation may begin at block 722, "RECEIVE JOB AT DATACENTER". At block 722, a datacenter such as the datacenter 332 of FIG. 3 may receive a new job that may exceed an existing capacity of the datacenter.

Block 722 may be followed by block 724, "DETERMINE SUITABILITY OF SUBCONTRACT DATACENTER." At block 724, a candidate datacenter's suitability to receive a job as subcontract datacenter from the datacenter 332 may be determined. The operations of block 724 may be performed in multiple steps. For example, at block 726 "DEPLOY REFERENCE TASK TO CANDIDATE DATACENTERS", one or more reference tasks may be deployed to datacenters available to accept jobs from the datacenter 332. The reference task(s) may be real applications or surrogate applications.

Block 726 may be followed by block 728 "RECEIVE ACTUAL COST AND RESOURCE CONSUMPTION DATA." At block 728, results of executing the reference task by the candidate datacenters may be received at the middleware 520.

Block 728 may be followed by block 730 "ANALYZE DATA." At block 730, the results may be analyzed by the middleware 520 to determine which candidate datacenter would be more suitable for the job(s) to be subcontracted. The determination of suitability may be repeated at predetermined intervals or on demand (e.g., when a new job is to be subcontracted and is different from past jobs such that past analysis results may not be applicable). The middleware 520 performing the operations for determining suitability of candidate datacenters may be part of the captive aggregator module 378 that distributes the jobs to subcontract datacenters.

Block 724 may be followed by block 732, "FORWARD JOB BASED ON ANALYSIS RESULTS." At block 732, the captive aggregator module 378 may send one or more jobs to subcontract datacenter(s) for execution. The captive aggregator module 378 may also manage delays and other aspects of subcontracting such that the process is transparent to a client.

Block 732 may be followed by block 734, "PROVIDE JOB RESULTS TO ORIGINATING CLIENT." At block 734, the results of the job may be received from a subcontract datacenter and provided to a requesting client. In some embodiments, at least a portion of the subcontracted job may be pulled back when capacity becomes available at the originating datacenter and completed there.

The functions performed at the blocks in the above described process are for illustration purposes. QoS aware captive aggregation with true datacenter testing may be implemented by similar processes with fewer or additional functions. In some examples, the functions may be performed in a different order. In some other examples, various functions may be eliminated. In still other examples, various functions may be divided into additional functions, or combined together into fewer functions.

Figure 8:
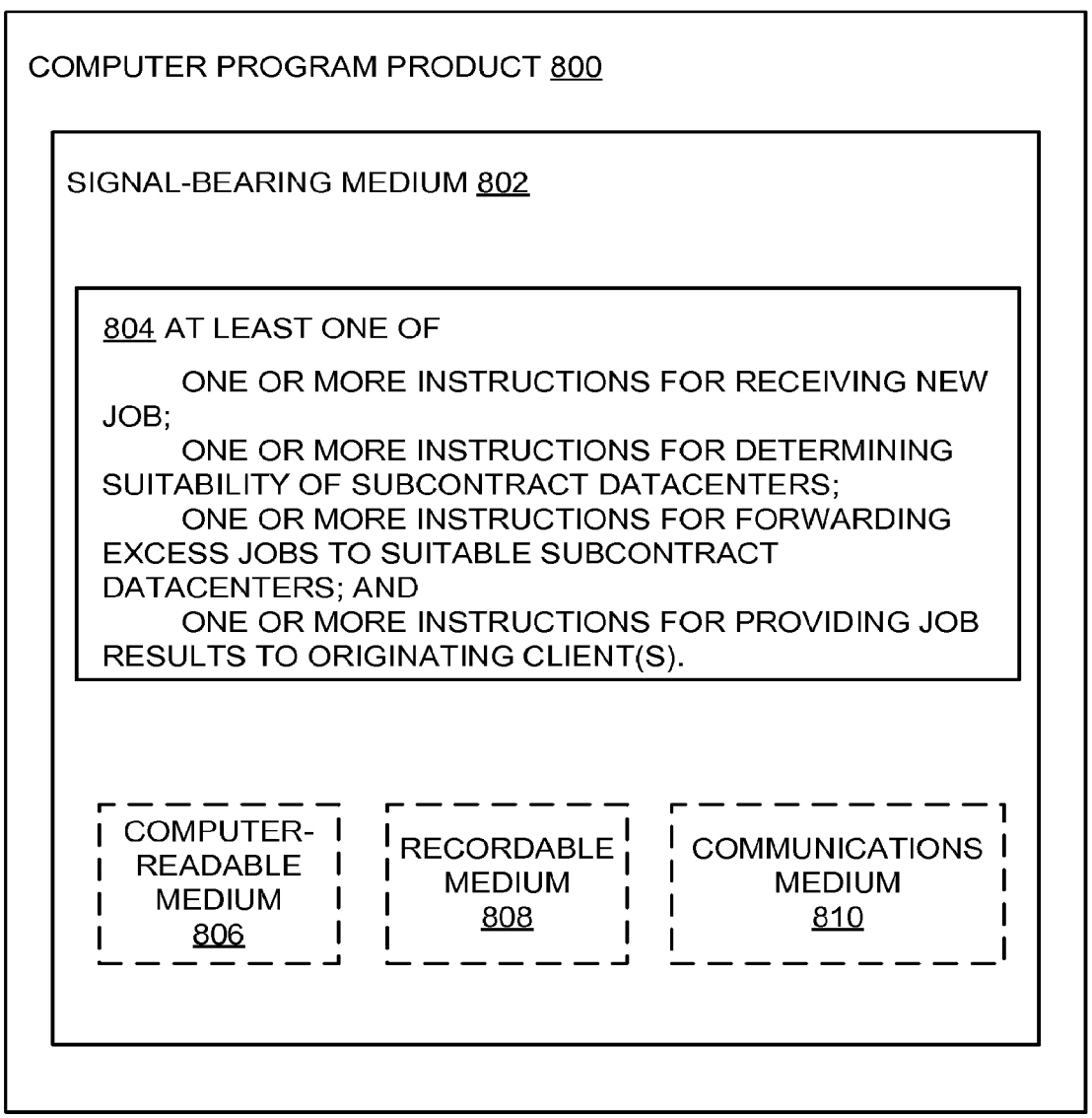
FIG. 8 illustrates a block diagram of an example computer program product, all arranged in accordance with at least some embodiments described herein.
Figure 4:
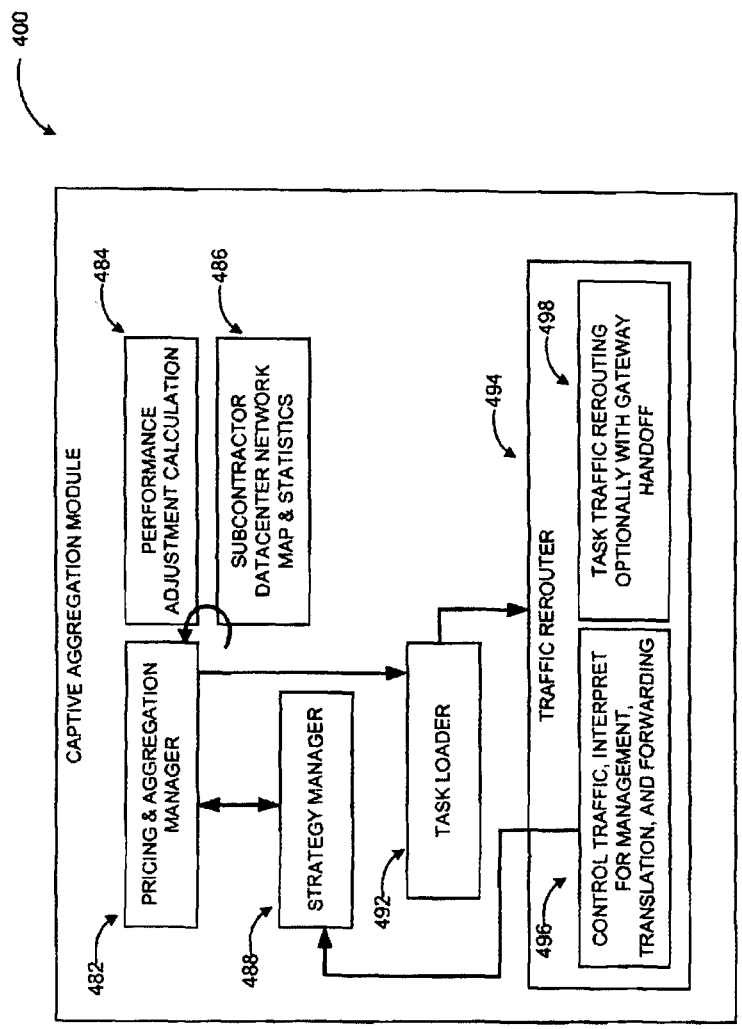

FIG. 8 illustrates a block diagram of an example computer program product, arranged in accordance with at least some embodiments described herein. In some examples, as shown in FIG. 8, the computer program product 800 may include a signal bearing medium 802 that may also include machine readable instructions 804 that, when executed by, for example, a processor, may provide the functionality described above with respect to FIG. 6. Thus, for example, referring to the processor 604, the captive aggregator 625 and middleware 627 may undertake one or more of the tasks shown in FIG. 8 in response to the instructions 804 conveyed to the processor 604 by the medium 802 to perform actions associated with implementing quality of service aware captive aggregation and true datacenter testing as described herein. Some of those instructions may include receiving a new job, determining suitability of subcontract datacenters, forwarding excess jobs to suitable subcontract datacenters, and/or providing job results to originating clients.

In some implementations, the signal bearing medium 802 depicted in FIG. 8 may encompass a computer-readable medium 806, such as, but not limited to, a hard disk drive, a Compact Disc (CD), a Digital Versatile Disk (DVD), a digital tape, memory, etc. In some implementations, the signal bearing medium 802 may encompass a recordable medium 808, such as, but not limited to, memory, read/write (R/W) CDs, R/W DVDs, etc. In some implementations, the signal bearing medium 802 may encompass a communications medium 810, such as, but not limited to, a digital and/or an analog communication medium (e.g., a fiber optic cable, a waveguide, a wired communications link, a wireless communication link, etc.). Thus, for example, the program product 800 may be conveyed to one or more modules of the processor 804 by an RF signal bearing medium, where the signal bearing medium 802 is conveyed by the wireless communications medium 810 (e.g., a wireless communications medium conforming with the IEEE 802.11 standard).

According to some examples, a method for managing Quality of Service (QoS) aware captive aggregation with datacenter testing through middleware is provided. The method may include receiving a job at a datacenter, determining a suitable subcontract datacenter for at least one of a plurality of existing jobs at the datacenter, forwarding the at least one existing job to the suitable subcontract datacenter, and upon receiving results of the forwarded job, providing the results to an originating client. The received job may exceed a capacity of the datacenter and a QoS for the forwarded job may be maintained at a substantially same level as if the job was performed at the datacenter.

The method may also include maintaining a database of available subcontract datacenter capabilities, network maps, and statistics. The method may further include enabling the originating client for the forwarded job to exchange data directly with the suitable subcontract datacenter, determining suitability of a subcontract datacenter based on a pricing structure, and/or pulling back the forwarded job prior to its completion at the suitable subcontract datacenter based on a pricing structure associated with the forwarded job.

Determining the suitability of a subcontract datacenter may include deploying a reference task to a plurality of candidate datacenters to perform identical tasks on resources, receiving data on an actual cost and resource consumption for performing the reference task, analyzing differences between the actual cost and resource consumption for performing the reference task at the datacenter and at a candidate datacenter, and/or forwarding the job based on analysis results. The candidate datacenters may be selected based on having substantially similar price and performance characteristics.

The method may further include generating a plurality of comparison metrics based on the analysis results, optimizing a task assignment function and assigning tasks based on the comparison metrics, where each job includes one or more tasks. The reference task may be an actual task from a received job, and the reference task may be a surrogate task with a plurality of calibration points. The method may also include recording timestamps at the calibration points.

The surrogate task may be configured to deploy in a model of an actual task application with similar levels of communications between blocks and computation between actions. The reference tasks may be employed to calibrate relative demand and performance in a predefined condition of a plurality of inputs. The method may also include distributing the reference task to secondary datacenters, dynamically modifying an interval of monitoring the candidate datacenters, and/or selecting the reference task based on a usage of resource diversity.

According to other examples, an apparatus for managing Quality of Service (QoS) aware captive aggregation with datacenter testing through middleware may include a memory and a processor coupled to the memory. The processor may be configured to execute a captive aggregation module in conjunction with a datacenter management application. The captive aggregation module may be configured to receive a job at a datacenter, where the received job exceeds a capacity of the datacenter; determine a suitable subcontract datacenter for at least one of a plurality of existing jobs at the datacenter; forward the at least one existing job to the suitable subcontract datacenter; and upon receiving results of the forwarded job, provide the results to an originating client, where a QoS for the forwarded job is maintained at a substantially same level as if the job was performed at the datacenter.

The captive aggregation module may also maintain a database of available subcontract datacenter capabilities, network maps, and statistics. The captive aggregation module may further enable the originating client for the forwarded job to exchange data directly with the suitable subcontract datacenter, determine suitability of a subcontract datacenter based on a pricing structure, and/or pull back the forwarded job prior to its completion at the suitable subcontract datacenter based on a pricing structure associated with the forwarded job.

The processor may be further configured to communicate with a middleware for determining the suitability of a subcontract datacenter. The middleware may be configured to deploy a reference task to a plurality of candidate datacenters to perform identical tasks on resources, receive data on an actual cost and resource consumption for performing the reference task, analyze differences between the actual cost and resource consumption for performing the reference task at the datacenter and at a candidate datacenter, and/or enable the captive aggregation module to forward the job based on analysis results.

The candidate datacenters may be selected based on having substantially similar price and performance characteristics. The middleware may also generate a plurality of comparison metrics based on the analysis results, optimize a task assignment function and enable assignment of tasks based on the comparison metrics, where each job includes one or more tasks. The reference task may be an actual task from a received job. The reference task may be a surrogate task with a plurality of calibration points.

The middleware may further record timestamps at the calibration points. The surrogate task may be configured to deploy in a model of an actual task application with similar levels of communications between blocks and computation between actions. The reference tasks may be employed to calibrate relative demand and performance in a predefined condition of a plurality of inputs. The middleware may also distribute the reference task to secondary datacenters, dynamically modify an interval of monitoring the candidate datacenters, and/or select the reference task based on a usage of resource diversity.

According to further examples, a captive aggregation module for managing Quality of Service (QoS) aware job distribution in conjunction with datacenter management may be provided. The captive aggregation module may be configured to receive a job at a datacenter, where the received job exceeds a capacity of the datacenter; determine a suitable subcontract datacenter for at least one of a plurality of existing jobs at the datacenter; forward the at least one existing job to the suitable subcontract datacenter; and upon receiving results of the forwarded job, provide the results to an originating client, where a QoS for the forwarded job is maintained at a substantially same level as if the job was performed at the datacenter.

The captive aggregation module may be further configured to maintain a database of available subcontract datacenter capabilities, network maps, and statistics; enable the originating client for the forwarded job to exchange data directly with the suitable subcontract datacenter; determine suitability of a subcontract datacenter based on a pricing structure; and/or pull back the forwarded job prior to its completion at the suitable subcontract datacenter based on a pricing structure associated with the forwarded job.

According to yet other examples, a middleware module may be provided for determining suitability of a subcontract datacenter in Quality of Service (QoS) aware job distribution in conjunction with datacenter management. The middleware module may be configured to deploy a reference task to a plurality of candidate datacenters to perform identical tasks on resources, receive data on an actual cost and resource consumption for performing the reference task, analyze differences between the actual cost and resource consumption for performing the reference task at a datacenter with excess jobs and at a candidate datacenter, and enable a captive aggregation module of the datacenter to forward the job based on analysis results.

The candidate datacenters may be selected based on having substantially similar price and performance characteristics. The middleware module may be further configured to generate a plurality of comparison metrics based on the analysis results and optimize a task assignment function and enable assignment of tasks based on the comparison metrics, where each job includes one or more tasks. The reference task may be an actual task from a received job. The reference task may also be a surrogate task with a plurality of calibration points.

The middleware module may record timestamps at the calibration points, where the surrogate task is configured to deploy in a model of an actual task application and have similar levels of communications between blocks and computation between actions. The reference tasks may be employed to calibrate relative demand and performance in a predefined condition of a plurality of inputs. The middleware module may further distribute the reference task to secondary datacenters, dynamically modify an interval of monitoring the candidate datacenters, and/or select the reference task based on a usage of resource diversity.

There is little distinction left between hardware and software implementations of aspects of systems; the use of hardware or software is generally (but not always, in that in certain contexts the choice between hardware and software may become significant) a design choice representing cost vs. efficiency tradeoffs. There are various vehicles by which processes and/or systems and/or other technologies described herein may be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g. as one or more programs running on one or more microprocessors), as firmware, or as virtually any combination thereof, and that designing the circuitry and/or writing the code for the software and or firmware would be well within the skill of one of skill in the art in light of this disclosure.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Versatile Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity of gantry systems; control motors for moving and/or adjusting components and/or quantities).

A typical data processing system may be implemented utilizing any suitable commercially available components, such as those typically found in data computing/communication and/or network computing/communication systems. The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically connectable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method to manage Quality of Service (QoS) aware captive aggregation with datacenter testing through middleware, the method comprising:
   receiving a job at a datacenter, wherein the received job exceeds a capacity of the datacenter;
   determining a suitable subcontract datacenter for at least one of a plurality of existing jobs at the datacenter by communicating with the middleware, the middleware configured to:
   deploy a reference task to a plurality of candidate datacenters to perform identical tasks on resources, wherein the reference task is a surrogate task with a plurality of calibration points, and the surrogate task is configured to deploy in a model of an actual task application with similar levels of communication between blocks and computation between actions; and
   receive data on an actual cost and resource consumption for performing the reference task;
   forwarding the at least one existing job to the suitable subcontract datacenter based on the received data; and
   upon receiving results of the forwarded job, providing the results to an originating client, wherein a QoS for the forwarded job is maintained at a substantially same level as if the job was performed at the datacenter.

2. The method according to claim 1, further comprising enabling the originating client for the forwarded job to exchange data directly with the suitable subcontract datacenter.

3. The method according to claim 1, further comprising determining suitability of a subcontract datacenter based on a pricing structure; and
   pulling back the forwarded job prior to its completion at the suitable subcontract datacenter based on a pricing structure associated with the forwarded job.

4. The method according to claim 1, wherein determining suitability of the subcontract datacenter further includes:
   analyzing differences between the actual cost and resource consumption for performing the reference task at the datacenter and at a candidate datacenter; and
   forwarding the job based on analysis results.

5. The method according to claim 4, wherein the candidate datacenters are selected based on having substantially similar price and performance characteristics.

6. The method according to claim 4, further comprising generating a plurality of comparison metrics based on the analysis results; and
   optimizing a task assignment function and assigning tasks based on the comparison metrics, wherein each job includes one or more tasks.

7. The method according to claim 1, further comprising recording timestamps at the calibration points.

8. An apparatus to manage Quality of Service (QoS) aware captive aggregation with datacenter testing through middleware, the apparatus comprising:
   a memory;
   a processor coupled to the memory, wherein the processor is configured to execute a captive aggregation module in conjunction with a datacenter management application, the captive aggregation module configured to:
   receive a job at a datacenter, wherein the received job exceeds a capacity of the datacenter;
   determine a suitable subcontract datacenter for at least one of a plurality of existing jobs at the datacenter by communicating with the middleware, the middleware configured to:
   deploy a reference task to a plurality of candidate datacenters to perform identical tasks on resources, wherein the reference task is a surrogate task with a plurality of calibration points, and the surrogate task is configured to deploy in a model of an actual task application with similar levels of communication between blocks and computation between actions; and
   receive data on an actual cost and resource consumption for performing the reference task;
   forward the at least one existing job to the suitable subcontract datacenter based on the received data; and
   upon receiving results of the forwarded job, provide the results to an originating client, wherein a QoS for the forwarded job is maintained at a substantially same level as if the job was performed at the datacenter.

9. The apparatus according to claim 8, wherein the middleware is further configured to:
   analyze differences between the actual cost and resource consumption for performing the reference task at the datacenter and at a candidate datacenter; and
   enable the captive aggregation module to forward the job based on analysis results.

10. The apparatus according to claim 8, wherein the reference tasks are employed to calibrate relative demand and performance in a predefined condition of a plurality of inputs.

11. The apparatus according to claim 8, wherein the middleware is further configured to
    distribute the reference task to secondary datacenters.

12. The apparatus according to claim 8, wherein the middleware is further configured to
    dynamically modify an interval of monitoring the candidate datacenters.

13. The apparatus according to claim 8, wherein the middleware is further configured to
    select the reference task based on a usage of resource diversity.

14. A datacenter to manage Quality of Service (QoS) aware captive aggregation with datacenter testing through middleware, the datacenter comprising:
    one or more servers configured to perform datacenter management tasks, wherein at least one server, as a part of the datacenter management tasks, is configured to execute a captive aggregation module, the captive aggregation module configured to:
    receive a job at a datacenter, wherein the received job exceeds a capacity of the datacenter;
    determine a suitable subcontract datacenter for at least one of a plurality of existing jobs at the datacenter by communicating with a middleware module, the middleware module configured to:
    deploy a reference task to a plurality of candidate datacenters to perform identical tasks on resources, wherein the reference task is a surrogate task with a plurality of calibration points, and the surrogate task is configured to deploy in a model of an actual task application with similar levels of communication between blocks and computation between actions; and
    receive data on an actual cost and resource consumption for performing the reference task;

forward the at least one existing job to the suitable subcontract datacenter based on the received data; and upon receiving results of the forwarded job, provide the results to an originating client, wherein a QoS for the forwarded job is maintained at a substantially same level as if the job was performed at the datacenter.

15. The datacenter according to claim 14, wherein the captive aggregation module is further configured to determine suitability of a subcontract datacenter based on a pricing structure; and pull back the forwarded job prior to its completion at the suitable subcontract datacenter based on a pricing structure associated with the forwarded job.

16. A datacenter to manage Quality of Service (QoS) aware captive aggregation with datacenter testing through middleware, the datacenter comprising:

one or more servers configured to perform datacenter management tasks, wherein at least one server, as a part of the datacenter management tasks, is configured to execute a middleware module, the middleware module configured to:

deploy a reference task to a plurality of candidate datacenters to perform identical tasks on resources, wherein the reference task is a surrogate task with a plurality of calibration points, and the surrogate task is configured to deploy in a model of an actual task application with similar levels of communication between blocks and computation between actions;

receive data on an actual cost and resource consumption for performing the reference task;

analyze differences between the actual cost and resource consumption for performing the reference task at a datacenter with excess jobs and at a candidate datacenter; and enable a captive aggregation module of the datacenter to forward the job based on analysis results.

17. The datacenter according to claim 16, wherein the candidate datacenters are selected based on having substantially similar price and performance characteristics.

18. The datacenter according to claim 16, wherein the middleware module is further configured to generate a plurality of comparison metrics based on the analysis results.

19. The datacenter according to claim 18, wherein the middleware module is further configured to optimize a task assignment function and enable assignment of tasks based on the comparison metrics, wherein each job includes one or more tasks.

20. The datacenter according to claim 16, wherein the reference task is employed to calibrate relative demand and performance in a predefined condition of a plurality of inputs.

21. The datacenter according to claim 16, wherein the middleware module is further configured to distribute the reference task to secondary datacenters.

* * * * *

UNITED STATES PATENT AND TRADEMARK OFFICE
CERTIFICATE OF CORRECTION

| | | |
|---|---|---|
| PATENT NO. | : 8,918,794 B2 | Page 1 of 2 |
| APPLICATION NO. | : 13/389796 | |
| DATED | : December 23, 2014 | |
| INVENTOR(S) | : Kruglick | |

It is certified that error appears in the above-identified patent and that said Letters Patent is hereby corrected as shown below:

In the Drawings

Delete Drawing Sheet 4, and replace with Drawing Sheet 4. (Attached)

In the Specification

In Column 1, Line 38, delete "storage 110." and insert -- storage I/O. --, therefor.

Signed and Sealed this
Fourteenth Day of July, 2015

Michelle K. Lee
*Director of the United States Patent and Trademark Office*